(12) United States Patent
Lipkowski et al.

(10) Patent No.: US 9,134,734 B2
(45) Date of Patent: Sep. 15, 2015

(54) METHOD FOR THE AUTONOMOUS LOCALIZATION OF A DRIVERLESS, MOTORIZED VEHICLE

(75) Inventors: Merten Lipkowski, Stuttgart (DE);
Thomas Wösch, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 13/985,883

(22) PCT Filed: Feb. 6, 2012

(86) PCT No.: PCT/EP2012/051925
§ 371 (c)(1),
(2), (4) Date: Aug. 16, 2013

(87) PCT Pub. No.: WO2012/110343
PCT Pub. Date: Aug. 23, 2012

(65) Prior Publication Data
US 2013/0325243 A1  Dec. 5, 2013

(30) Foreign Application Priority Data
Feb. 16, 2011 (EP) .................................. 11154607

(51) Int. Cl.
*G05D 1/02* (2006.01)
*G01S 17/02* (2006.01)

(52) U.S. Cl.
CPC .............. *G05D 1/024* (2013.01); *G01S 17/023* (2013.01); *G05D 1/0274* (2013.01); *G05D 2201/0216* (2013.01)

(58) Field of Classification Search
CPC ... G05D 1/0236; G05D 1/024; G05D 1/0274; G01S 17/023
USPC ........................................................ 701/25
See application file for complete search history.

(56) References Cited

U.S. PATENT DOCUMENTS 4,790,402 A * 12/1988 Field et al. ..................... 180/169
4,796,198 A * 1/1989 Boultinghouse et al. ....... 701/23
(Continued)

FOREIGN PATENT DOCUMENTS

| CN | 1247149 | 3/2000 |
| CN | 1838171 A | 9/2006 |

(Continued)

OTHER PUBLICATIONS

JPO machine translation of JP 2000-213936 (original JP document published Aug. 4, 2000).*

(Continued)

*Primary Examiner* — Behrang Badii
*Assistant Examiner* — David Testardi
(74) *Attorney, Agent, or Firm* — Staas & Halsey LLP

(57) ABSTRACT

A range-measuring sensor is arranged on a vehicle. The direction of measurement or plane of measurement of the sensor can be altered by driving a sensor motor. A map of the environment is produced by using natural landmarks. A predetermined route along which the vehicle is intended to move is stipulated. Landmarks which can serve as a localization aid along the predetermined route are determined. The environment is scanned at different times by using the sensor in order to detect the previously determined landmarks while the vehicle is moving along the predetermined route. The vehicle is localized by comparing the detected landmarks with the landmarks recorded on the map. The sensor motor is actively controlled, at least in areas of the environment with only a few previously determined landmarks, such that the sensor is oriented to these landmarks in order to ensure that they are detected.

7 Claims, 4 Drawing Sheets

(56) References Cited

U.S. PATENT DOCUMENTS

| | | | |
|---|---|---|---|
| 4,811,228 A * | 3/1989 | Hyyppa | 701/25 |
| 5,008,557 A * | 4/1991 | Noji et al. | 250/559.38 |
| 5,011,288 A * | 4/1991 | Noji et al. | 356/622 |
| 5,031,103 A * | 7/1991 | Kamimura et al. | 701/23 |
| 5,255,195 A * | 10/1993 | Mochizuki et al. | 701/23 |
| 5,260,770 A * | 11/1993 | Nakamura et al. | 356/622 |
| 5,367,458 A * | 11/1994 | Roberts et al. | 701/25 |
| 5,483,455 A * | 1/1996 | Lay et al. | 701/469 |
| 6,108,076 A * | 8/2000 | Hanseder | 356/141.1 |
| 6,208,916 B1 * | 3/2001 | Hori | 701/28 |
| 7,437,243 B2 | 10/2008 | Fujimoto | |
| 8,099,205 B2 * | 1/2012 | Coats et al. | 701/23 |
| 2008/0027591 A1 | 1/2008 | Lenser et al. | |
| 2013/0054187 A1 * | 2/2013 | Pochiraju et al. | 702/150 |

FOREIGN PATENT DOCUMENTS

| | | | | |
|---|---|---|---|---|
| DE | 3821892 C1 * | 2/1990 | | B62D 33/06 |
| EP | 11154607.3 | 2/2011 | | |
| JP | 02045783 A * | 2/1990 | | G01S 7/02 |
| JP | 02161374 A * | 6/1990 | | G01S 5/16 |
| JP | 04081677 A * | 3/1992 | | G01S 5/16 |
| JP | 10197635 A * | 7/1998 | | G01S 17/08 |
| JP | 2950933 | 7/1999 | | |
| JP | 2950933 B2 * | 7/1999 | | |
| JP | 2000099145 A * | 4/2000 | | G05D 1/02 |
| JP | 2000-213936 | 8/2000 | | |
| JP | 2000213936 A * | 8/2000 | | G01C 15/00 |
| JP | 2007225342 A * | 9/2007 | | |
| JP | 2008020370 A * | 1/2008 | | |
| JP | 2008139035 A * | 6/2008 | | |
| JP | 2008241273 A * | 10/2008 | | |
| JP | 2009175066 A * | 8/2009 | | |
| WO | WO 2005024536 A1 * | 3/2005 | | G05D 1/02 |
| WO | PCT/EP2012/051925 | 2/2012 | | |

OTHER PUBLICATIONS

JPO machine translation of JP 2950933 B2 (original JP document published Jul. 9, 1999).*

Nishide, Ken-ichi et al., "A position and heading measurement system for robots—Laser Navigator", The 5th International Symposium on Robotics in Construction, Jun. 6-8, 1988, Tokyo, Japan, pp. 317ff.*

Gebre, Biruk et al., "Remotely operated and autonomous mapping system (ROAMS)", IEEE International Conference on Technologies for Practical Robot Applications 2009 (TePRA 2009), Nov. 9-10, 2009, pp. 173-178.*

Levinson, Jesse et al., "Map based precision vehicle localization in urban environments", Robotics: Science and Systems III, Jun. 27-30, 2007, Atlanta, Georgia, 8 pages.*

Tsumura, Toshihiro et al., "A new method of position and heading measurement of ground vehicle by use of laser and corner cubes", 34th IEEE Vehicular Technology Conference, 1984, May 21-23, 1984, pp. 271-276.*

Artur Arsénio et al., "Active Range Sensing for Mobile Robot Localization," Proceedings of the 1998 IEEE/RSJ Intl. Conference on Intelligent Robots and Systems, Oct. 1998, pp. 1066-1071.

Joseph Nsasi Bakambu, "Integrated Autonomous System for Exploration and Navigation in Underground Mines," Proceedings of the 2006 IEEE/RSJ International Conference on Intelligent Robots and Systems, Oct. 9-15, 2006, pp. 2308-2313.

Panos E. Trahanias et al., "Visual Recognition of Workspace Landmarks for Topological Navigation," Autonomous Robots, Kluwer Academic Publishers, vol. 7, 1999, pp. 143-158.

A. Lallement et al., "Laser-Vision Cooperation for Map Building and Landmarks Recognition," Proceedings of the 1998 IEEE ISIC/CIRA/ISAS Joint Conference, Sep. 14-17, 1998, pp. 387-392.

German language copy of European Office Action for European Priority Patent Application No. 11154607.3, issued Jul. 13, 2011, 11 pages.

English language copy of International Search Report for PCT/EP2012/051925, mailed on May 24, 2012, 3 pages.

Australian Office Action for related Australian Patent Application No. 2012217286, issued Oct. 13, 2014, 4 pages.

Chinese Office Action issued Feb. 16, 2015 in corresponding Chinese Patent Application No. 2012800091048.

* cited by examiner

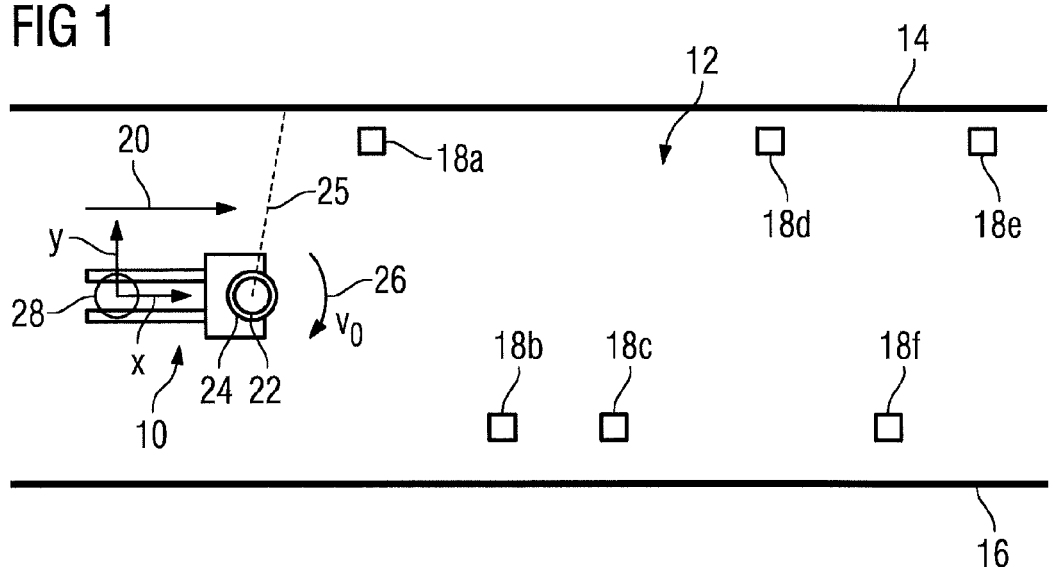
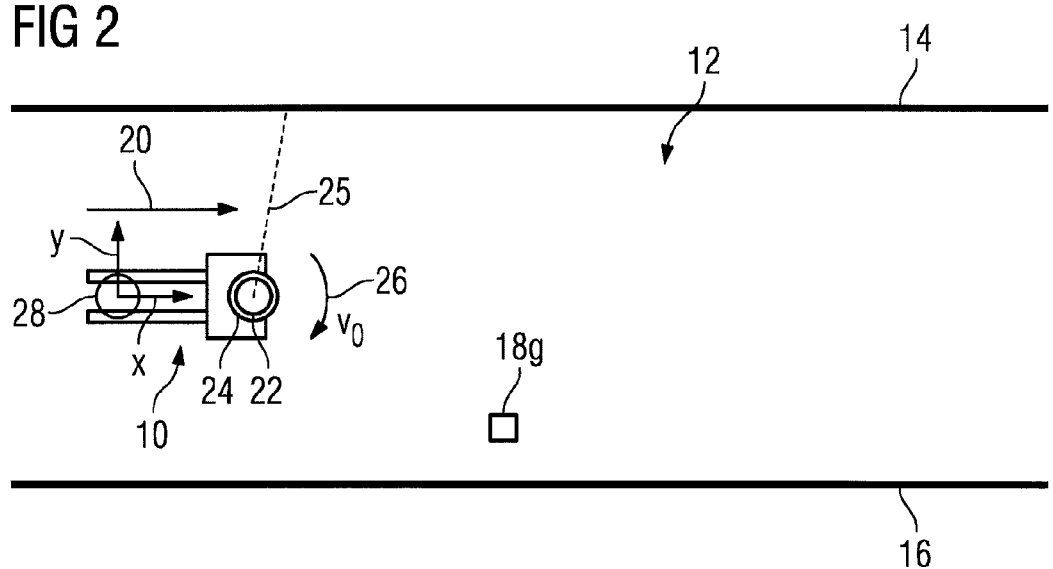

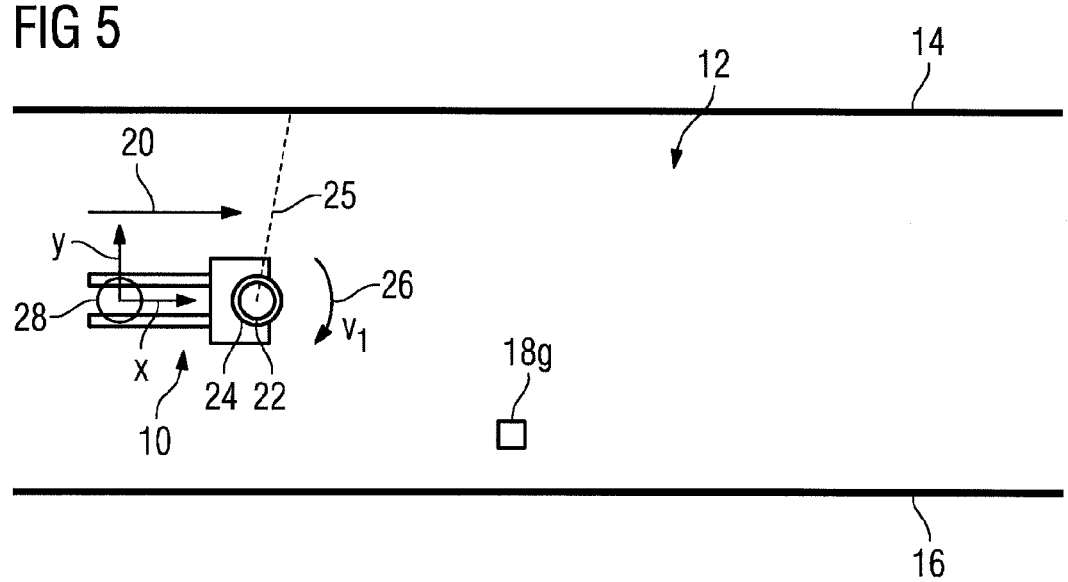
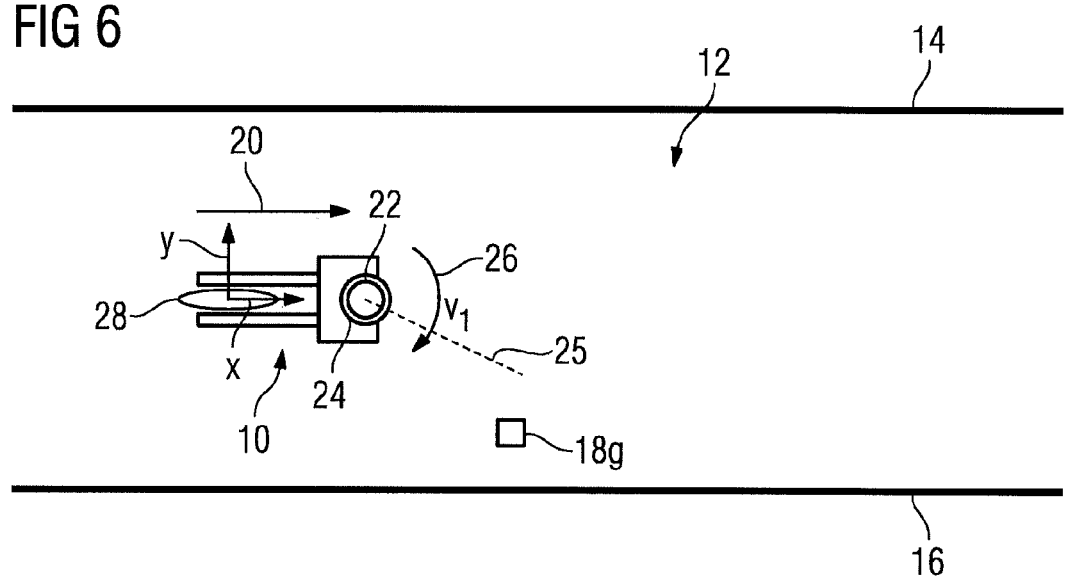

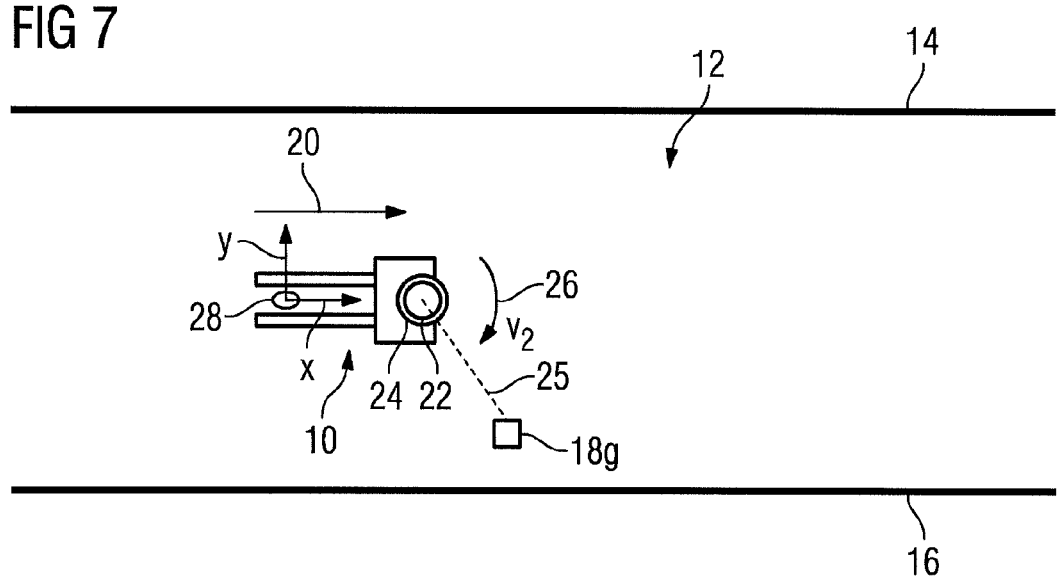
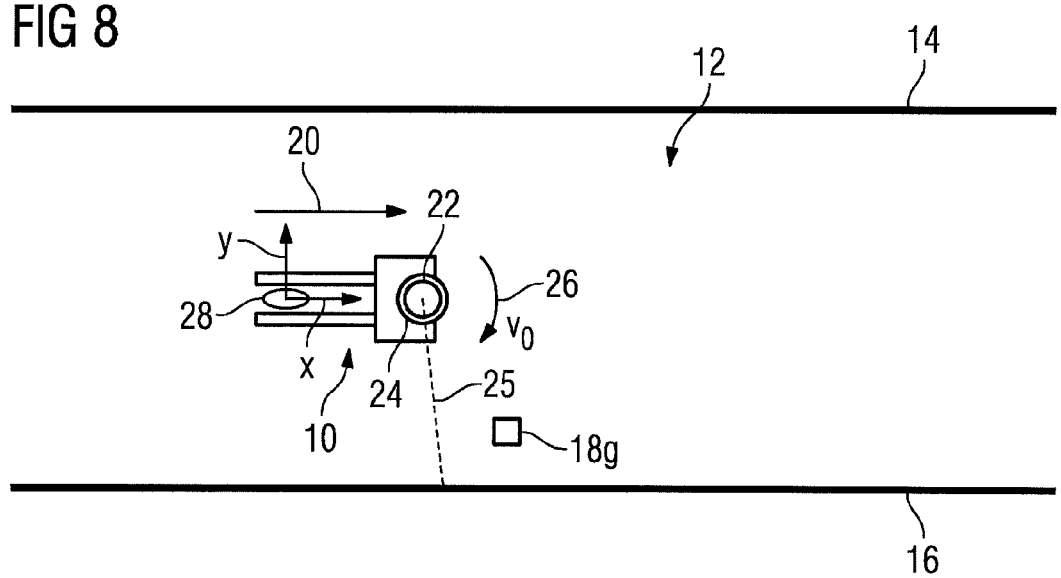

METHOD FOR THE AUTONOMOUS LOCALIZATION OF A DRIVERLESS, MOTORIZED VEHICLE

CROSS REFERENCE TO RELATED APPLICATIONS

This application is based on and hereby claims priority to International Application No. PCT/EP2012/051925 filed on Feb. 6, 2012 and European Application No. 11154607.3 filed on Feb. 16, 2011, the contents of which are hereby incorporated by reference.

BACKGROUND

The present invention relates to a method for the autonomous localization of a driverless motorized vehicle within a known environment using at least one sensor.

Methods of this type are known in a variety of designs from the related art. They serve to determine the position of a driverless motorized vehicle and by this, driverless navigation of the vehicle is enabled.

Localization methods of this type are used, for example, in the field of warehouse logistics. For the transport of loads in this domain, driverless, motorized vehicles are increasingly used in order to achieve a high level of automation.

Localization methods exist which make use of 'artificial' landmarks in the form of additional installations such as reflector markers, guide wires, radio stations or the like. These artificial landmarks are placed within the known environment in which the vehicle is to be localized such that, firstly, sufficient landmarks are present for reliable localization and, secondly, such that the associated equipment complexity and costs are kept as low as possible. As the sensor for detecting the artificial landmarks, for example, a range-measuring sensor in the form, for example, of a laser scanner can be used which is mounted on the vehicle and is pivoted evenly back and forth about a pivot axis using a sensor motor.

Autonomous localization methods, however, do not use artificial landmarks, but natural landmarks such as geometrical structural elements present in the environment in the form of tubes, beams, columns and the like. By this, a high degree of flexibility with highly accurate localization is achieved without impinging upon the environment. This has the advantage, in particular, that vehicle routes can be changed without any great financial or time cost. In this case also, a laser scanner which is mounted on the vehicle and is pivoted back and forth about a pivot axis can serve as the sensor.

Such autonomous localization methods function well provided sufficient environment information in the form of natural landmarks which can be detected with a suitable sensor are available. In practice, however, it often occurs that some environment regions have only few natural landmarks that can serve for localizing the vehicle. In such regions, it is therefore particularly important actually to detect and use the small amount of available information. However, the proper detection of landmarks by the sensor used can only be ensured through a suitably large measurement data density, for which a particular amount of time is required. Accordingly, the whole environment of the vehicle cannot be detected at once, but only gradually, with a corresponding chronological offset. This can have the effect that, due to the vehicle movement, some regions of the environment are not detected at all or only inadequately. In other words, it can occur that landmarks are passed by without being detected. In regions where sufficient landmarks are present, this is usually not problematic.

However, in regions where only a few landmarks exist, the non-detection of a landmark can have the result that the vehicle can no longer be localized, which leads to halting of the vehicle.

SUMMARY

Proceeding from this related art, it is one potential object to provide a method of the aforementioned type wherein it is ensured that landmarks in critical regions of the environment in which there are only a few landmarks are also reliably detected in order, in this way, to prevent the vehicle coming to a standstill.

The inventors propose a method for the autonomous localization of a driverless motorized vehicle within a known environment using a range-measuring sensor arranged on the vehicle, the measurement direction or measurement plane of which can be changed by controlling at least one sensor motor, the method comprising the following steps: creating a map of the environment based on natural landmarks; defining a pre-determined route along which the vehicle is to move; determining those landmarks which can serve as a localization aid along the pre-determined route; scanning the environment at different time points using the sensor to detect the previously determined landmarks while the vehicle is moving along the pre-determined route; and localizing the vehicle by comparing the detected landmarks with the landmarks recorded on the map; wherein the speed and/or the direction of rotation of the sensor motor is/are controlled, at least in areas of the environment with only a few previously determined landmarks, such that the sensor is actively oriented toward said landmarks in order to ensure that they are detected. In other words, the sensor is actively guided, at least in regions of the environment having only few landmarks and is oriented toward said landmarks in that the speed and/or the rotation direction of the sensor motor are changed accordingly. In this way, detection of the landmarks in critical regions of the environment is ensured, so that the current position of the vehicle cannot become lost. As a result, neither a standstill of the vehicle nor an interruption of the vehicle navigation can occur.

According to one embodiment, a laser scanner which measures in one plane is used as the sensor, the measurement plane of which is pivotable by controlling the sensor motor. The measurement space is correspondingly detected in three dimensions through the combination of the motor movement and the laser plane.

Alternatively, a single-beam laser which is fastened on a motor and is pivotable about two pivot axes, is used as the sensor. Alternatively, the beam thereof can also be deflected by a mirror arranged to be pivotable about two pivot axes on a motor.

Preferably during localization of the vehicle, the vehicle speed detected by a further sensor is taken into account. Taking into account the current vehicle speed, firstly, the speed at which the sensor motor must be driven in order to ensure reliable recording of specific landmarks can be very precisely determined. Secondly, scans performed at different time points can be logically linked to one another via the vehicle speed.

According to another embodiment, the speed and/or the rotation direction of the sensor motor is/are controlled such that the sensor scans at least landmarks in environment regions with only few previously determined landmarks more intensively than other landmarks, in particular over a relatively long duration. By increasing the density of measurement data, the expected value of the positional uncertainty of the vehicle can be minimized because the error from one geometrical structure element or from one natural landmark becomes smaller as the number of measurements increases.

Regions in which no information can be obtained, on the other hand, are preferably observed with a reduced intensity or not at all. Thus the number of unnecessary measurements falls drastically, simplifying the processing of the measurement data detected because, through observation exclusively of relevant regions, the calculation effort for localizing the vehicle is reduced.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a schematic plan view of a motorized vehicle to be localized;

FIGS. 2 to 4 are schematic plan views which illustrate the functioning of a known autonomous localization method and the disadvantages associated therewith; and FIGS. 5 to 8 are schematic plan views which illustrate the functioning of a localization method according to one embodiment of the proposal and the advantages associated therewith.

DETAILED DESCRIPTION OF THE PREFERRED EMBODIMENT

Figure 3:
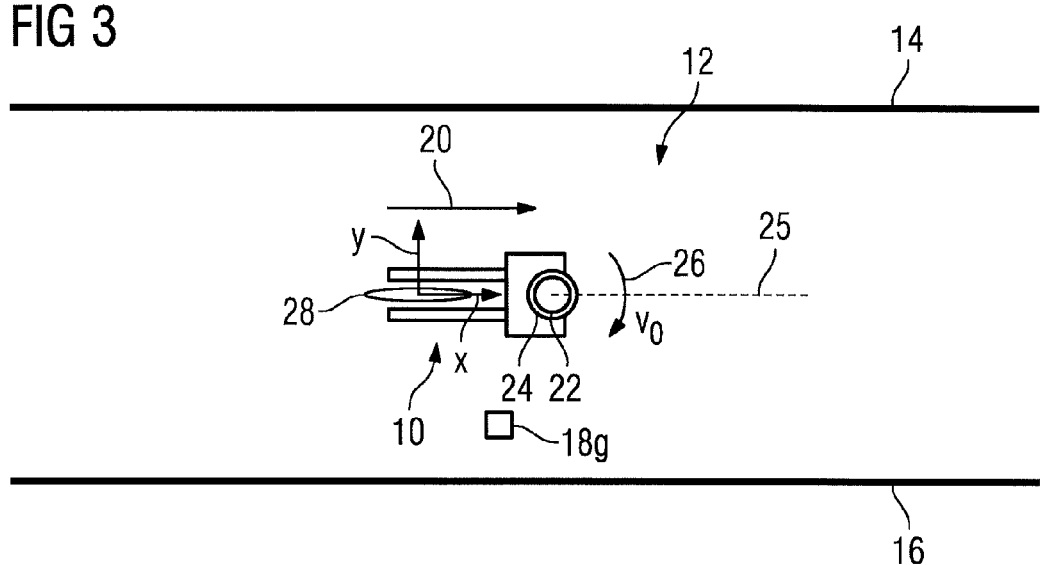

Reference will now be made in detail to the preferred embodiments of the present invention, examples of which are illustrated in the accompanying drawings, wherein like reference numerals refer to like elements throughout.

FIG. 1 shows a schematic plan view of a driverless, motorized vehicle 10 which is to be localized using an autonomous localization method within a known environment 12 which, in the present case, is delimited by two walls 14 and 16 arranged opposing one another. Localization of the vehicle 10 is carried out using natural landmarks in the form of the walls 14 and 16 and in the form of geometrical structural elements 18a, b, c, d, e, f present in the environment 12, such as pipes, beams, columns and the like. These natural landmarks 14, 16, 18a to f are detected during movement of the vehicle 10 in the movement direction indicated by the arrow 20 with the aid of a range-measuring sensor 22 arranged on the vehicle 10, the sensor being a laser scanner in the present case. The sensor 22 is arranged on a sensor motor 24 so that the measurement plane 25 thereof is pivotable about a pivot axis (not shown in detail) by controlling the sensor motor 24. By pivoting the sensor 22, as indicated by the arrow 26, the environment 12 can be scanned in a three-dimensional manner accordingly, in order, in this way, to detect the landmarks 14, 16, 18. The circle 28 symbolizes the positional uncertainty of the vehicle 10 in the X and Y directions.

In a known autonomous localization method, the sensor motor 24 is continuously driven at a constant speed $V_0$ in the direction of the arrow 26 to detect the landmarks 14, 16, 18a to f. The speed $V_0$ is selected such that the sensor 22 detects the environment 12 with a sufficiently great data density. In other words, the sensor 22 cannot be rotated at any desired speed, since otherwise detection of the landmarks 18a to f would not be possible. In order to localize the vehicle 10 in the environment 12, the landmarks 14, 16, 18 detected are then compared with landmarks recorded on a previously created map. In this way, the vehicle 10 can be navigated.

On detection of the walls or landmarks 14, 16, said items essentially supply localization information concerning the Y-position and the orientation of the vehicle 10. Once the landmarks 18a to f have been detected, said landmarks essentially supply localization information concerning the X-position of the vehicle 10.

Detection of the landmarks 14, 16 is not critical, due to the extent thereof in the present example. Driving past without detecting said landmarks is not possible. Therefore localization of the vehicle in the Y-position and orientation is provided at all times. By contrast therewith, localization of the X-positions of the vehicle is critical, as the following description shows.

Due to the movement of the vehicle 10 and the time necessary for scanning the environment at the required data density, it can occur that some of the landmarks 18a to f are not detected. This is the case if the sensor 22 is oriented in another direction while the vehicle 10 drives past one of the landmarks 18a to f, particularly in a different direction. The relevant landmarks 18a to f are therefore "passed by". In regions of the environment in which sufficient landmarks 18a to f are present, this is not problematic because sufficient other landmarks 18a to f are detected based on which, localization of the vehicle 10 can be carried out. What is critical, however, is "passing by" in regions of the environment with only few landmarks, as the description based on FIGS. 2 and to 4 shows.

Figure 4:
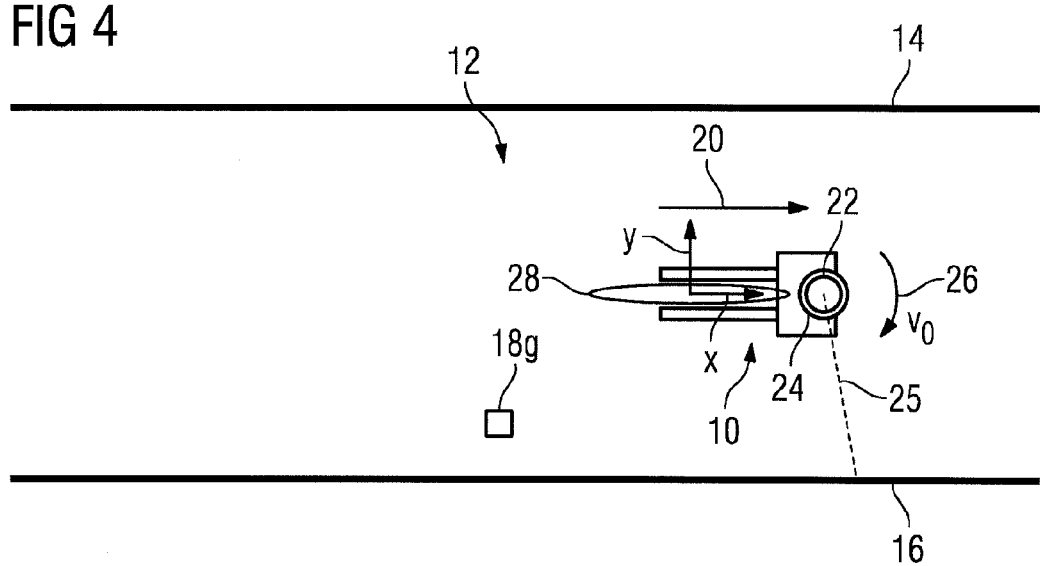

FIGS. 2 to 4 show instantaneous events during the scanning of an environment region in which only a single landmark 18g is present which can be used for localization of the vehicle 10 within this environment region. FIG. 1 shows the vehicle 10 moving in the direction of the arrow 20, in a first position in which the sensor 22 is oriented in the direction of the wall 14. If the vehicle 10 is now moved further from the position shown in FIG. 2 in the direction of the arrow 20 into the position shown in FIG. 3 while the sensor 22 is rotated in the direction of the arrow 26 by actuation of the sensor motor 24 at the constant speed $V_0$, the positional uncertainty in the Y-direction improves due to the fact that the distances from the wall 14 have been detected by the sensor 22. By contrast, the positional uncertainty in the X-direction increases, since no landmark could be detected in this section. If the vehicle 10 is now moved further from the position shown in FIG. 3 in the direction of the arrow 20 into the position shown in FIG. 4, it is clear that the landmark 18g will be passed by without the sensor 22 being able to detect said landmark. Here, the positional uncertainty in the X-direction increases such that localization of the vehicle 10 within the environment 12 is no longer possible and for this reason, the vehicle 10 comes to a halt.

This problem is solved by the proposed localization method, as described in greater detail below by reference to FIGS. 5 to 8 on the basis of an exemplary embodiment of the proposed method.

In the proposed autonomous localization method, a map of the environment 12 is first created based on the natural landmarks 14, 16, 18 contained therein. In a further step, a predetermined route along which the vehicle 10 is to move within the environment 12 is defined. Thereafter, the landmarks 18 which can serve as a localization aid along the pre-determined route are determined. During this process, critical regions of the environment are identified in which only a few of the previously identified landmarks 18 are present.

The vehicle 10 is now moved in the direction of the arrow 20 at an even speed along the pre-determined route and the sensor motor 24 is driven at a constant speed $V_0$ in order to pivot the sensor 22. If the vehicle 10 enters one of the previously identified critical environment regions in which only a few landmarks are provided—in the present case, only a single landmark 18g, as shown in FIG. 2—the sensor motor 24 is actively accelerated from the speed $V_0$ to the speed $V_1$ so that the sensor 22 rotates significantly faster in the direction of the arrow 26. In this process, the positional uncertainty in the Y-direction reduces, as shown in FIG. 6, whilst the positional uncertainty in the X-direction increases, as described above in relation to FIGS. 2 and 3. Shortly before the time point at which the sensor 22 detects the landmark 18g, the sensor motor 24 is actively controlled again in order to reduce the speed $V_1$ to a speed $V_2$, $V_2$ being smaller than $V_0$. This has the result that the sensor 22 detects the landmark 18g with a very high measurement data density, so that the positional uncertainty in the X-direction is greatly reduced, as shown in FIG. 7. After detection of the landmark 18g by the sensor 22, the sensor motor 24 is again actively controlled in order to increase the speed thereof again, for example to the speed $V_0$, as shown in FIG. 8.

It should be made clear that not only the sensor motor speed, but also the direction of rotation of the sensor motor 24 can be changed to ensure landmark detection. Alternatively, the sensor 22 can be a single-beam laser mounted on a motor, rotatable about two pivot axes, or the measuring beam thereof is deflected by a mirror fastened to a motor to be rotatable about two pivot axes.

A significant advantage of the autonomous localization proposed method as compared with the method described in relation to FIGS. 2 to 4 lies therein that active control of the sensor motor 24 is ensured, that landmarks are also detected in the environment regions in which only a few landmarks are available, so that the vehicle 10 can always be localized within the environment 12. Loss of the vehicle position and an associated cessation of navigation are precluded. A reduction in the vehicle speed in critical environment regions to ensure the detection of landmarks is also not required. The reduction in the sensor motor speed from the speed $V_1$ to the speed $V_2$ in the vicinity of a landmark 18g in a critical environment region enables the measurement data density to be increased and, in this way, reliable detection of the relevant landmark 18g to be achieved. Increasing the sensor motor speed from $V_0$ to $V_1$ and the associated reduction in the measurement data density leads thereto that the corresponding environment section is scanned less intensively. This is unproblematic since the previously performed analysis of the pre-determined route produced the result that, in the environment section that the sensor 22 scans during the acceleration of the sensor motor 24, there are no relevant landmarks 18 present. In environment sections without landmarks 18, scanning can also be entirely dispensed with, providing the positional uncertainty in the Y-direction is not too large. The fewer unnecessary measurement data that are recorded, the quicker and more simply the vehicle 10 can be localized within the environment 12.

If the vehicle speed is not constant, then said speed is preferably detected by a suitable sensor, for example, using a sensor detecting rotary speed of the vehicle wheels. The currently detected vehicle speed is then taken into account for the localization of the vehicle 10.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for the autonomous localization of a driverless motorized vehicle within a known environment, comprising:
   using a sensor arranged on the vehicle for range-measuring;
   changing at least one of a measurement direction and a measurement plane of the sensor by controlling a sensor motor;
   obtaining a map of the environment, the map having natural landmarks recorded thereon, the natural landmarks being landmarks that are not placed in the environment for the purpose of localization;
   stipulating a pre-determined route along which the vehicle is to move;
   identifying landmarks along the pre-determined route, to serve as localization aids, and identifying one or more critical regions in the environment along the pre-determined route, the one or more critical regions being regions which contain a number of landmarks that is below a threshold value;
   scanning the environment at different points in time, while the vehicle is moving along the pre-determined route, the environment being scanned using the sensor to detect the landmarks along the pre-determined route; and
   localizing the vehicle by comparing the landmarks identified along the pre-determined route with the landmarks recorded on the map;
   actively controlling a speed and/or a rotation direction of the sensor motor at least while the vehicle is moving in the one or more critical regions such that the sensor is oriented toward the landmarks in the one or more critical regions, in order to ensure detection of the landmarks in the one or more critical regions.

2. The method as claimed in claim 1, wherein
   the sensor is a laser scanner which measures in one measurement plane, and
   the measurement plane is pivoted by controlling the sensor motor.

3. The method as claimed in claim 1, wherein
   the sensor is a single-beam laser, and
   the single-beam laser is mounted on the sensor motor to be rotatable about two pivot axes.

4. The method as claimed in claim 1, wherein
   during localization of the vehicle, a vehicle speed is detected by a speed detector, and
   the vehicle speed is taken into account in controlling the speed and/or the rotation direction of the sensor motor.

5. The method as claimed in claim 1, wherein
   the sensor motor is controlled such that the sensor rotates faster in the one or more critical regions than in regions other than the one or more critical regions.

6. The method as claimed in claim 1, wherein
   the sensor rotates at a predetermined rotational speed in regions other than the one or more critical regions, and
   the sensor rotates a rotational speed greater than the predetermined rotational speed in the one or more critical regions.

7. The method as claimed in claim 1, wherein
   the map has a non-populated area with no natural landmarks,
   the method further comprises actively controlling the speed and/or the rotation direction of the sensor motor such that the sensor does not scan for landmarks in the non-populated area.

* * * * *

UNITED STATES PATENT AND TRADEMARK OFFICE
CERTIFICATE OF CORRECTION

| | | |
|---|---|---|
| PATENT NO. | : 9,134,734 B2 | Page 1 of 1 |
| APPLICATION NO. | : 13/985883 | |
| DATED | : September 15, 2015 | |
| INVENTOR(S) | : Lipkowski et al. | |

It is certified that error appears in the above-identified patent and that said Letters Patent is hereby corrected as shown below:

In the claims

Claim 6, Column 6, Line 56

Delete "rotates a rotational" and insert --rotates at a rotational--, therefor.

Signed and Sealed this
Eighth Day of December, 2015

Michelle K. Lee
*Director of the United States Patent and Trademark Office*